(12) United States Patent
Slowe et al.

(10) Patent No.: US 7,046,732 B1
(45) Date of Patent: May 16, 2006

(54) VIDEO COLORING BOOK

(75) Inventors: Thomas E. Slowe, Middlleburg, VA (US); Paul C. Brewer, Arlington, VA (US); Robert J. Douglass, Oak Hill, VA (US); Thomas M. Strat, McLean, VA (US); Thomas J. Burns, McLean, VA (US); Andrew J. Chosak, McLean, VA (US)

(73) Assignee: ObjectVideo, Inc., Reston, VA (US)

( * ) Notice: Subject to any disclaimer, the term of this patent is extended or adjusted under 35 U.S.C. 154(b) by 609 days.

(21) Appl. No.: 09/978,592

(22) Filed: Oct. 18, 2001

Related U.S. Application Data

(63) Continuation-in-part of application No. 09/881,065, filed on Jun. 15, 2001, and a continuation-in-part of application No. 09/956,971, filed on Sep. 21, 2001.

(51) Int. Cl.
*H04N 7/18* (2006.01)
(52) U.S. Cl. ............. 375/240.16; 347/154; 347/155; 375/240.17; 375/240.26
(58) Field of Classification Search .......... 375/240.08, 375/240.11–240.29; 386/53; 348/576, 589; 34/143–160
See application file for complete search history.

(56) References Cited

U.S. PATENT DOCUMENTS

| | | | | |
|---|---|---|---|---|
| 5,557,684 A | * | 9/1996 | Wang et al. | 382/107 |
| 6,806,879 B1 | * | 10/2004 | Isner | 345/474 |
| 2002/0118875 A1 | * | 8/2002 | Wilensky | 382/173 |
| 2004/0174361 A1 | * | 9/2004 | Yomdin et al. | 345/441 |
| 2005/0031038 A1 | * | 2/2005 | Zhang et al. | 375/240.16 |

* cited by examiner

*Primary Examiner*—Anand Rao
(74) *Attorney, Agent, or Firm*—Venable LLP; Michael A. Sartori; Caroline J. Swindell

(57) ABSTRACT

A decomposed original video sequence includes one or more original camera-motion layers and zero or more original fixed-frame layers decomposed from an original video sequence. The decomposed original video sequence is edited by editing at least one of the original camera-motion layers to obtain modified camera-motion layers such that each frame of a composite modified video sequence composed from the modified camera-motion layers and the original fixed-frame layers is obtained without editing each frame of said original video sequence. The editing comprises performing an edge operation to one of said original camera-motion layers.

33 Claims, 10 Drawing Sheets

VIDEO COLORING BOOK

CROSS-REFERENCE TO RELATED APPLICATIONS

This application is a C-I-P of and claims the priority of U.S. patent application Ser. No. 09/881,065, filed Jun. 15, 2001, and U.S. patent application Ser. No. 09/956,971, filed Sep. 21, 2001, both of which are incorporated herein by reference.

BACKGROUND OF THE INVENTION

1. Field of the Invention

The invention relates to a system for video editing and, particularly, editing of video sequences encoded to an object representation using object-based video encoding to implement a video coloring book.

2. Background of the Invention

In object-based video encoding (or representation), a video sequence is encoded as (or decomposed to or converted to) a decomposed video sequence comprising two streams, a first stream for a background composite of the video sequence and a second stream for foreground regions of the video sequence. The background composite is encoded only once in the first stream. On the other hand, the foreground regions are moving and are encoded for every frame of the video sequence in the second stream. The two streams of the object-based encoded video are then stored or transmitted. The video sequence is reconstituted by composing the decomposed video sequence to obtain a composite video sequence.

Object-based video encoding is different from traditional frame-based encoding, which uses only one stream. Through storing or transmitting the decomposed video sequence, significant savings in memory or bandwidth are achieved over traditional framed-based encoding in which each frame of the video sequence is stored or transmitted as a single stream. Additional memory or bandwidth savings can be achieved by compressing the two streams of the decomposed video sequence prior to storage or transmission. In addition to conventional approaches for object-based video encoding, generation of the background composite and the foreground regions is discussed in commonly-assigned U.S. patent application Ser. No. 09/472,162, filed Dec. 27, 1999, and Ser. No. 09/609,919, filed Jul. 3, 2000, both of which are incorporated herein by reference.

In conventional video editing, a video sequence is obtained, and the video sequence is edited on a frame-by-frame basis. To edit an aspect of the video sequence that appears over a number of sequential frames, each frame must be edited individually. Thereafter, if desired, the resulting modified video sequence may be encoded using object-based video encoding or any other type of video compression. This conventional technique is very laborious and time consuming.

In another conventional technique for video editing, the video sequence is encoded as a number of video layers. For each video layer, the content in the video layer changes for each frame. Further, no equivalent to the background composite discussed above for the object-based video encoding is obtained. To edit one of the video layers, a nonlinear editor (NLE) is typically used to edit the video layer on a frame-by-frame basis. To edit an aspect of the video sequence that appears over a number of sequential frames, each frame of the affected video layers must be edited individually. Although some NLE's have the ability to extrapolate a change to a frame in a video layer to a small number of frames in the same video layer forwards or backwards in time from the changed frame, this conventional video editing technique is likewise very laborious and time consuming.

SUMMARY OF THE INVENTION

An object of the invention is to provide a system to edit video efficiently.

A further object of the invention is to provide a system to edit video faster than with conventional techniques.

An additional object of the invention is to provide a system to obtain edited video having greater realism than edited video obtained with conventional techniques.

Another object of the invention is to provide a system that permits editing a video sequence without editing each frame individually.

Another additional object of the invention is to provide a video coloring book.

The invention includes a method, a system, an apparatus, and an article of manufacture for video editing.

The article of manufacture of the invention includes a computer-readable medium having software for editing a decomposed original video sequence. The decomposed original video sequence comprises one or more original camera-motion layers and zero or more original fixed-frame layers decomposed from an original video sequence. The software comprises code segments for editing at least one of the original camera-motion layers to obtain modified camera-motion layers such that each frame of a composite modified video sequence composed from the modified camera-motion layers and the original fixed-frame layers is obtained without editing each frame of the original video sequence. The editing comprises performing an edge operation to one of said original camera-motion layers. The computer-readable medium further comprises code segments for editing at least one of the original fixed-frame layers to obtain modified fixed-frame layers.

The apparatus of the invention includes an apparatus for editing an original video sequence comprising: an object-based video encoder to decompose the original video sequence into a decomposed original video sequence, the decomposed original video sequence comprising one or more original camera-motion layers and zero or more original fixed-frame layers; a video editor to perform an edge operation to one of the original camera-motion layers and to edit the edge operated original camera-motion layers to obtain a decomposed modified video sequence; and an object-based video compositor to compose the decomposed modified video sequence to obtain a composite modified video sequence, wherein each frame of the composite modified video sequence is obtained without editing each frame of the original video sequence.

The method of the invention includes steps in accordance with the invention.

The system of the invention includes a computer system comprising a computer-readable medium having software to operate a computer in accordance with the invention.

The apparatus of the invention includes a computer comprising a computer-readable medium having software to operate the computer in accordance with the invention.

The article of manufacture of the invention includes a computer-readable medium having software to operate a computer in accordance with the invention.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DEFINITIONS

A "video" refers to motion pictures represented in analog and/or digital form. Examples of video include: television, movies, image sequences from a video camera or other observer, and computer-generated image sequences.

A "frame" refers to a particular image or other discrete unit within a video.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

With the invention, an original video sequence is edited in a decomposed form, which is different from the conventional approach of editing individually each frame of the original video sequence. By changing a small aspect of the decomposed original video sequence, every frame of the composite modified video sequence can be affected without the need to edit every frame of the original video sequence. Depending on which aspects of the decomposed original video sequence are edited, some or all of the composite modified video sequence can be affected.

Figure 1:
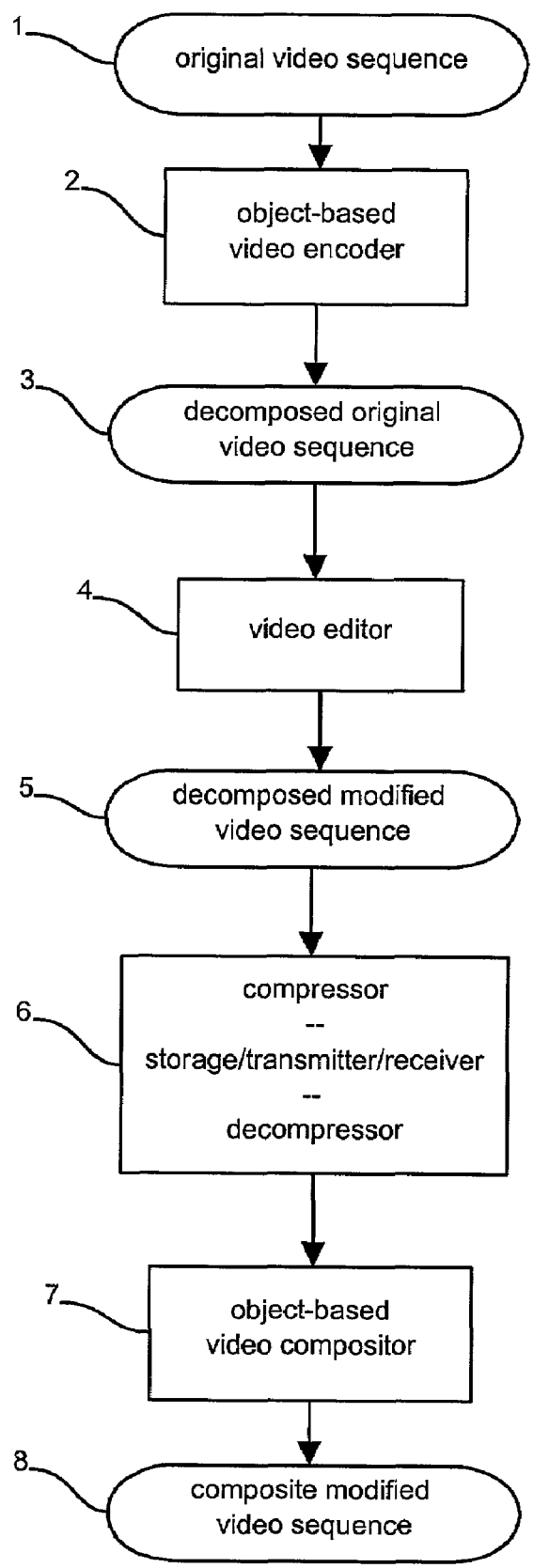
FIG. 1 illustrates a plan view of the invention.
Figure 2:
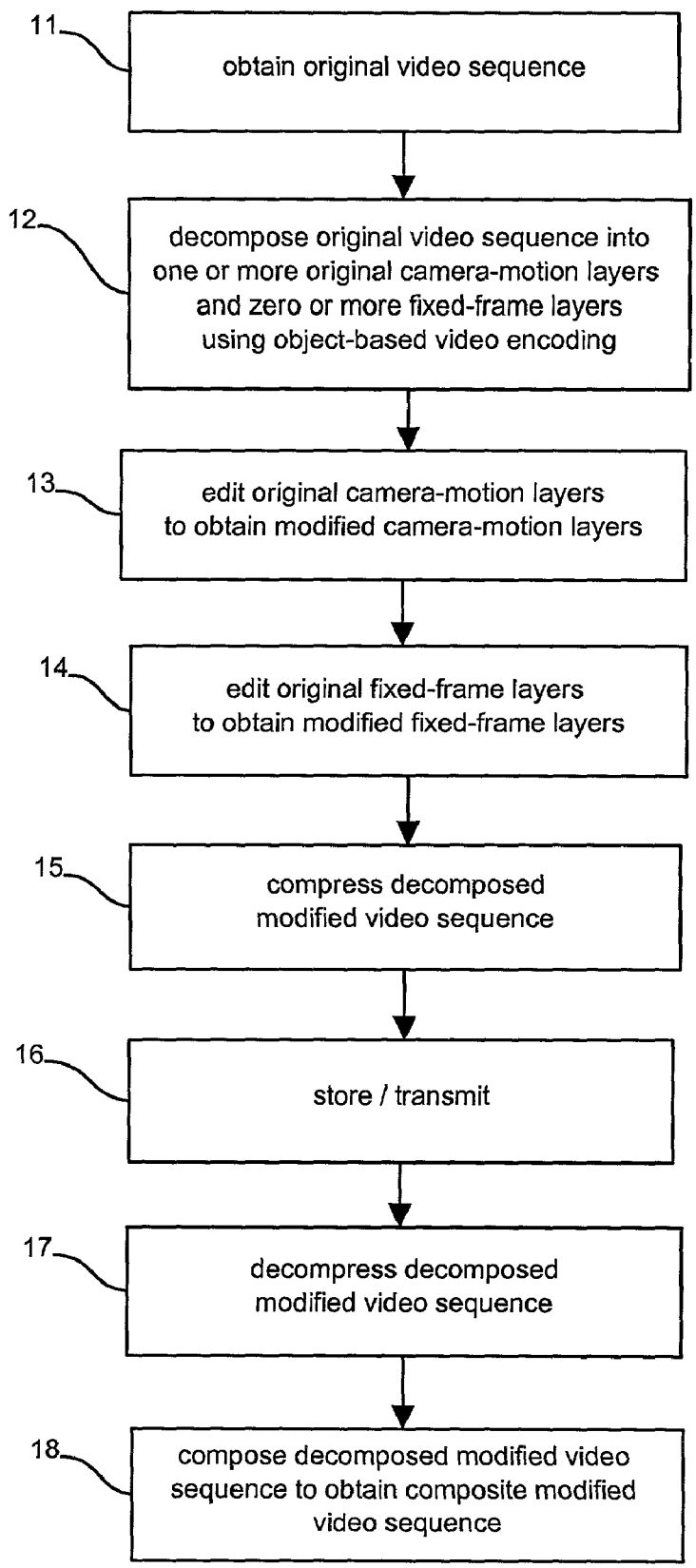
FIG. 2 illustrates a flow diagram of the invention.

FIG. 1 illustrates a plan view of the invention, and FIG. 2 illustrates a flow diagram of the invention. In block 11, an original video sequence 1 is obtained. The original video sequence can be obtained from, for example, a live feed, a storage device, or a network connection. The original video sequence can be from a recording, computer-generated graphics, or a combination of both. The original video sequence can be a previous original video sequence modified according to the invention. The original video sequence, for example, includes one or more frames. The original video sequence can be, for example, a portion of a video or an entire video. As a portion of a video, the original video sequence can be, for example, one continuance sequence of one or more frames of the video or two or more discontinuous sequences of one or more frames of the video.

In block 12, the original video sequence 1 is decomposed by the object-based video encoder 2 to obtain a decomposed original video sequence 3. The decomposed original video sequence 1 comprises at least one original camera-motion layer, zero or more original fixed-framed layers, and other encoding information, including camera motion parameters. The original video sequence is decomposed into multiple layers, namely original camera-motion layers and original fixed-frame layers.

The camera-motion layers are layers that appear to move with the camera as the camera moves. The camera-motion layers can be considered to be in the background of a frame, but they are not necessarily always in what a viewer would refer to as the background. The camera-motion layers generally correspond to the background of a video frame, but they are not limited to being in the background. The apparent motion of the background due to camera motion is recreated by reprojecting the relevant part of the camera-motion layers according to the desired motion of the camera as dictated by the camera motion parameters. As an example, the background composite discussed above can be considered to be a camera-motion layer. As another example, with the MPEG-4 international standard for representing digital video, the so-called "sprite," which is the background of a video and which is a single image that represents all the background points in a video sequence, can be considered to be a camera-motion layer. As a further example, an original video sequence can be decomposed into a decomposed original video sequence having original camera-motion layers as well as camera motion parameters using the techniques discussed in commonly-assigned U.S. patent application Ser. No. 09/472,162, filed Dec. 27, 1999, and Ser. No. 09/609,919, filed Jul. 3, 2000.

Various types of camera-motion layers are possible, including static camera-motion layers, video camera-motion layers, and animation camera-motion layers. For a static camera-motion layer, the layer is an image that is warped in accordance with the camera motion parameters, thereby giving the illusion of motion.

For a video camera-motion layer, the video camera-motion layer can be a video itself. The time and space extents of the video camera-motion layer govern when and where the video camera-motion layer appears in the composite video sequence. The frames of the video camera-motion layer are synchronized with frames of the composite video sequence. The camera motion parameters govern how each frame of the video sequence is warped into the geometry of the composite video sequence.

For an animation camera-motion layer, the animation camera-motion layer can be an animation itself. The animation can be an animation in any format useful for defining animation. Examples of such formats include Flash and animated GIF. The time and space extents of the animation camera-motion layer govern when and where the animation camera-motion layer appears in the composite video sequence. The frames of the animation camera-motion layer are synchronized with frames of the composite video sequence. The camera motion parameters govern how each frame of the animation is warped into the geometry of the composite video sequence.

Camera-motion layers have camera motion parameters associated with each frame, which allow the camera-motion layers to appear to move as the camera moves. This is accomplished by warping the image data into the coordinate system of each successive frame according to the camera motion parameters. With the camera motion parameters, the camera motion gives a consistent motion view with respect to a moving camera. The camera motion parameters of the camera-motion layers for a particular frame can be the same or different.

The camera motion parameters dictate the camera movement with respect to the camera-motion layers. The camera motion parameters specify the mathematical relationship between one coordinate system and another. Here, the camera motion parameters specify the coordinate transformation from the image plane of the camera-motion layer to the image plane of the video frame. Camera motion parameters dictate, for example, pan, zoom, tilt, and roll of the camera. Camera motion parameters can be specified in a number of mathematically equivalent ways. For example, camera motion parameters can be expressed as a homogeneous 3×3 matrix M, where $$\begin{bmatrix} u \\ v \\ f \end{bmatrix} = M \begin{bmatrix} x \\ y \\ 1 \end{bmatrix}$$

such that (u/f, v/f) are coordinates in the image plane of the video frame, and (x, y) are the coordinates in the image plane of the camera-motion layer. As another example, camera motion parameters can be expressed as a list of numbers corresponding to analytical parameters such as the three rotational angles, three translational offsets, and a scale change.

The fixed-frame layers are fixed with respect to the video frame. The fixed-frame layers can be considered to be in the foreground of a frame, but they are not necessarily always in what a viewer would refer to as the foreground. The fixed-frame layers generally correspond to the foreground of a video frame, but they are not limited to being in the foreground. Each fixed-frame layer has separate information content for each frame. The fixed-frame layers are represented in two-dimensional space. As an example, the foreground regions discussed above can be considered to be a fixed-frame layers. As another example, with the MPEG-4 international standard for representing digital video, the video object layers (VOL) can be considered to be fixed-frame layers. As a further example, an original video sequence can be decomposed into a decomposed original video sequence having original fixed-frame layers using the techniques discussed in commonly-assigned U.S. patent application Ser. No. 09/472,162, filed Dec. 27, 1999, and Ser. No. 09/609,919, filed Jul. 3, 2000.

Camera-motion layers and fixed-frame layers have a number of similar attributes. For example, both types of layers have extent in time and space. With respect to time, both types of layers can have on/off times. An on/off time indicates when a particular layer is part of the composite video stream and when it is not. A particular layer can have zero or more on/off times. With respect to space, both types of layers can be a full rectangular frame or an arbitrarily shaped region having an area greater than or less than a frame. Both types of layers can have varying degrees of opaqueness, which is the inverse of transparency. Further, each layer can have a relative ordering with respect to the other layers. The ordering of the layers dictates the precedence of one layer with respect to the other layers (e.g., which layer occludes which other layers).

In block 13, one or more original camera-motion layers are edited by the video editor 4, which results in one or more modified camera-motion layers. Each original camera-motion layer either can be edited as an original camera-motion layer or can be edited by converting the original camera-motion layer to an image and editing the image, as discussed below with respect to FIG. 3. Further, various techniques are available for editing the original camera-motion layers, as discussed below with respect to FIG. 4.

By editing a single camera-motion layer, the entire video sequence relying on the camera-motion layer is modified. With the invention, by only editing a single camera-motion layer, the corresponding sequence of frames in the composite video sequence is affected. Compared to the conventional techniques, the technique of the invention does not require every frame of the video sequence to be edited to effect a change in the resulting composite video sequence.

In general, the modified camera-motion layers include one or more modified original camera-motion layers, one or more deleted original camera-motion layers, and/or one or more added camera-motion layers.

In general, any edits to an original camera-motion layer can be saved by changing the original camera-motion layer to a modified camera-motion layer or by saving a second camera-motion layer incorporating the changes and leaving the original camera-motion layer untouched.

In block 14, one or more original fixed-frame layers are edited by the video editor 4, which results in one or more modified fixed-frame layers. Each fixed-frame layer either can be edited as an original fixed-frame layer or can be edited by converting the original fixed-frame layer to an image and editing the image, as discussed below with respect to FIG. 5. Further, various techniques are available editing the fixed-frame layers, as discussed below with respect to FIG. 6.

In general, the modified fixed-frame layers include one or more modified original fixed-frame layers, one or more deleted original fixed-frame layers, and/or one or more added fixed-frame layers.

In general, any edits to an original fixed-frame layer can be saved by changing the original fixed-frame layer to a modified fixed-frame layer or by saving a second fixed-frame layer incorporating the changes and leaving the original fixed-frame layer untouched.

After blocks 13 and 14 are performed, a decompressed modified video sequence 5 results. The decompressed modified video sequence 5 includes the modified layers from blocks 13 and 14 and any original layers from block 12 that were not modified in blocks 13 and 14.

In block 15, the decompressed modified video sequence 5 is compressed to obtain a compressed video sequence. The decompressed modified video sequence is compressed using, for example, object-based compression as defined in, for example, the main profile of the visual layer of the MPEG-4 international standard.

In block 16, the compressed video sequence is stored and/or transmitted.

In block 17, the compressed video sequence is decompressed to reconstitute the decompressed modified video sequence 5. The decompression in block 17 is the reciprocal technique of the compression in block 15.

Blocks 15, 16, and 17 are performed by the compressor-storage/transmitter/receiver-decompressor 6 in FIG. 1, which may be performed by the same computer system or different computer systems.

In block 18, a composite modified video sequence 8 is composed by the object-based video compositor 7 from the decompressed modified video sequence 5. The object-based video compositor 7 uses the camera motion parameters in the decompressed modified video sequence 5 to reproject the camera-motion layers. The composite modified video sequence 8 can be compared to a composite original video sequence obtained from the decomposed original video sequence 3 using the object-based video compositor 7. The composite modified video sequence 8 differs from such a composite original video sequence depending on the extent of the edits performed by the video editor 4 in blocks 13 and 14.

Various alternatives are available for the flow diagram of FIG. 2. For example, block 14 is optional. As another example, blocks 15 and 17 are optional. As a further example, block 16 is optional.

As another option for FIG. 2, block 13, in whole or in part, and/or block 14, in whole or in part, can be included with block 18 and performed when the composite modified video sequence is obtained. For example, the camera-motion layer and/or one of the fixed frame layers can be edited during composition. With this option, a user can modify the camera-motion layer and/or one of the fixed-frame layers in real time while viewing the composite modified video sequence. The camera-motion layers and/or the fixed-frame layers can be modified according to the any of the techniques described herein. With respect to FIG. 4, the camera-motion layer can be modified, for example, by editing the camera motion parameters as in block 46. With respect to FIG. 6, one of more of the fixed-frame layers can be modified, for example, by deleting an object as in block 62. As an example, the edits can be performed while the composite modified video sequence is being viewed. The editing can be based on user input from a user input device, such as, for example, a joystick, a mouse, a keyboard, or a stylus.

Figure 3:
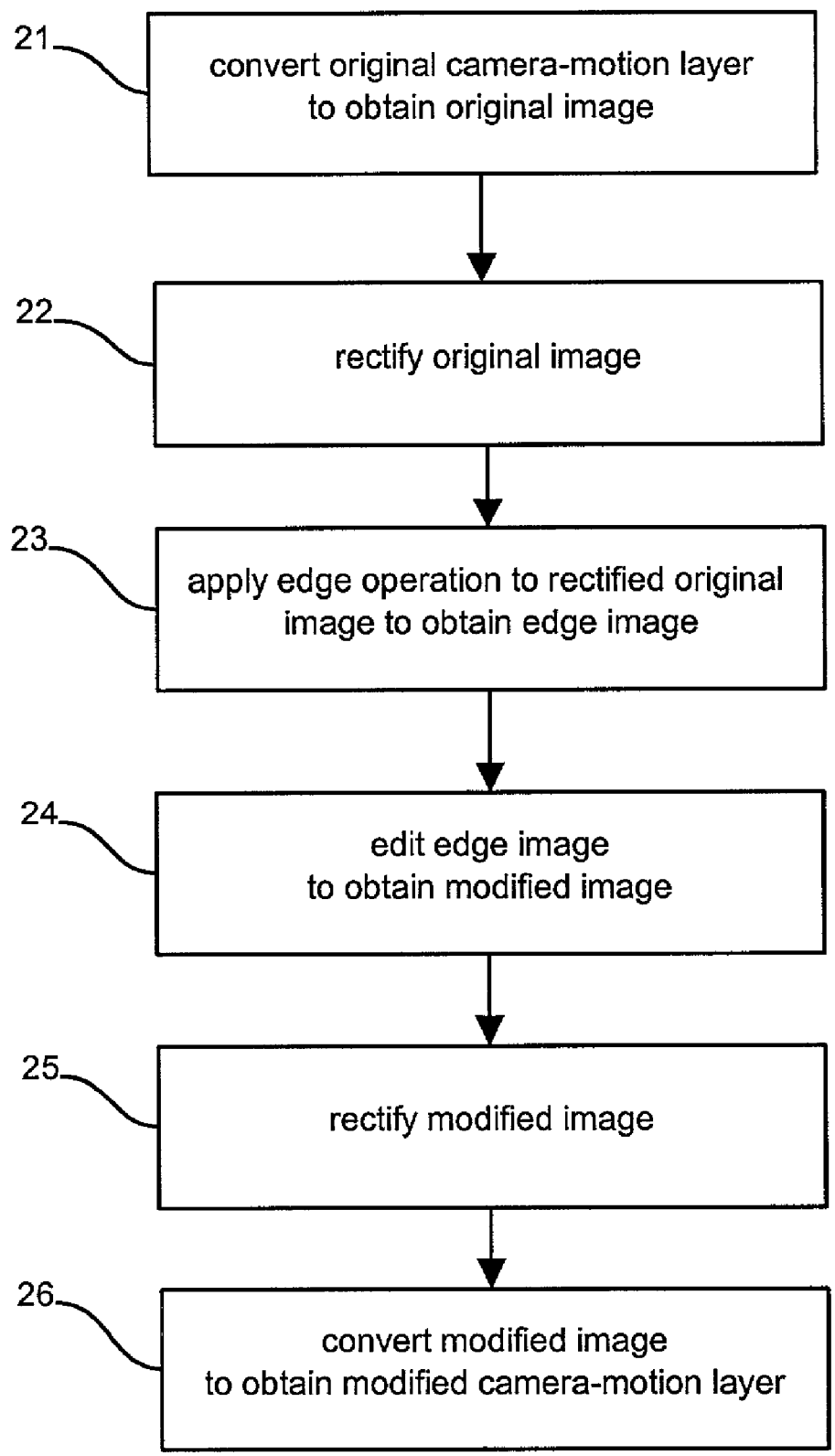
FIG. 3 illustrates a flow diagram for editing a camera-motion layer.

FIG. 3 illustrates a flow diagram for editing a camera-motion layer in block 13 of FIG. 2. In block 21, the camera-motion layer is converted to an image. The three-dimensional representation of the camera-motion layer is converted to a two-dimensional representation of the image. The image can be, for example, a JPEG file.

In block 22, the image from block 21 is rectified from the image plane to an ordinary perspective plane. An image, in general, is the projection of the three-dimensional world onto an image plane, a two-dimensional space. Rectification is the process of reprojecting from the image plane onto another plane, which is not necessarily parallel to the image plane. When rectifying the image onto an ordinary perspective plane, the rectification can be accomplished without knowledge of the three-dimensional locations of the points of the underlying three-dimensional world.

In block 23, an edge operation is applied to the rectified image from block 22 to obtain an edge image. The edge operation determines edges of features in the rectified image, and the edge image can be regarded as a line-based rendering of the rectified image. Examples of an edge operation include Sobel and other gradient operators.

In block 24, the edge image from block 23 is edited to obtain a modified image. The image can be edited in a number of ways as discussed further below with respect to FIG. 4. The image can be edited, for example, by using Adobe PhotoShop. By editing the edge image of a camera-motion layer, the entire video sequence relying on the camera-motion layer is modified. With the invention, only the camera-motion layer is edited, and the corresponding sequence of frames in the composite modified video sequence is affected. This is a powerful advantage over the conventional techniques, which require every frame of the video sequence to be edited.

In block 25, the modified image is rectified from the ordinary perspective plane to the original image plane.

In block 26, the modified image rectified in block 25 is converted to obtain a modified camera-motion layer. The conversion in block 26 is the reciprocal of the conversion in block 21.

Figure 4:
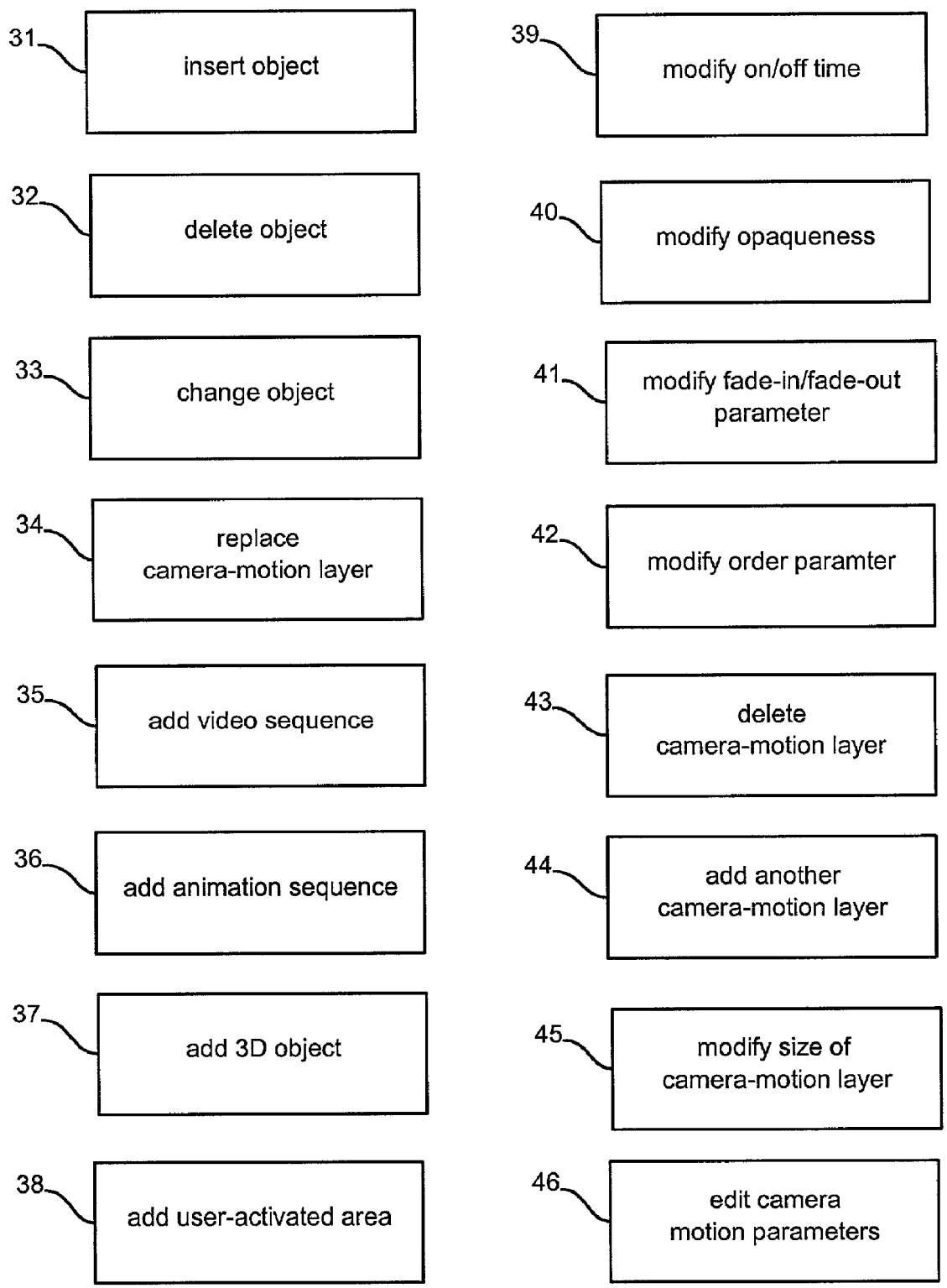
FIG. 4 illustrates various aspects of editing a camera-motion layer.

FIG. 4 illustrates various aspects of editing a camera-motion layer in block 13 of FIG. 2 and in block 24 of FIG. 3. FIG. 4 illustrates various editing possibilities with the invention. One or more camera-motion layers can be edited using one or more of the possibilities illustrated in FIG. 4. The possibilities in FIG. 4 are generally described as being applicable to camera-motion layers because they are applicable to editing both original camera-motion layers and modified camera-motion layers. As discussed above, a single change to one camera-motion layer affects the entire video sequence of multiple frames relying on the camera-motion layer, and the single change does not need to be made laboriously to each frame of the original video sequence.

If a modification discussed herein is saved as an additional camera-motion layer, leaving the original camera-motion layer untouched, the additional camera-motion layer can have various effects parameters associated with it, such as an on/off time, a level of opaqueness, and/or a fade-in/fade-out parameter.

The editing possibilities depicted in FIG. 4 can be accomplished using conventional software. For example, images can be edited using Photoshop by Adobe Systems Incorporated of San Jose, Calif. As another example, video can be edited using Premiere by Adobe Systems Incorporated of San Jose, Calif. As a further example, three-dimensional animation can be performed using 3D Studio MAX by Discreet of Montreal, Quebec, Canada.

In block 31, an object is inserted in a camera-motion layer. The edges of the inserted object are preferably blended so that it is difficult to determine that the object is an artificial insertion. As an example, a machine for dispensing canned soda can be inserted into a video scene of a hotel lobby. In addition, the carpet next to the soda machine can be changed to account for the fluorescent light from the soda machine. Further, using on/off times, the soda machine can be seen to appear and then disappear from the hotel lobby during the composite modified video sequence.

In block 32, an object is deleted from a camera-motion layer. One or more portions of the static background of the camera-motion can be removed (e.g., "airbrushed out") such that it is difficult to determine the portion of the background that has been modified. As an example, a door can be deleted from the wall in a video scene of a hotel lobby. In place of the door, the pattern of the wall can be repeated.

In block 33, an object is changed in a camera-motion layer. Changing an object includes aspects of inserting an object and deleting an object to make a change to the camera-motion layer. As an example, a potted plant in a video scene of a hotel lobby can be moved from one location to another. Further, using fade-in/fade-out parameters, the potted plant can appear in the composite modified video sequence to vanish slowly from one location and to reappear slowly in another location.

In block 34, the camera-motion layer is entirely replaced with another camera-motion layer. The replacing camera-motion layer can be obtained from a video sequence or can be an image. Examples of such an image include: a computer-generated image; a computer-aided drawing; a digital photograph; a scanned image; and a frame from a video sequence. As an example, the guests checking into one hotel lobby in the original video sequence can be viewed in the composite modified video sequence to be checking into an entirely different hotel lobby or into a cartoon hotel lobby.

In block 35, a video sequence is added to a camera-motion layer. A video window is inserted in the camera-motion layer that maintains the motion characteristics of the camera via the camera motion parameters of the decomposed original video sequence. This is an example of a video camera-motion layer. As an option, the camera motion parameters of the video camera-motion layer can be the same as or different from the camera motion parameters of the original camera-motion layers. As a specific example of such a video camera-motion layer, consider an original video sequence depicting a scene passing by the storefront of a T.V. repair shop. The video camera-motion layer can be located in front of the monitor of one of the T.V. sets in the T.V. repair shop window. Foreground objects in the video can obscure the video camera-motion layer by moving in front of the T.V. set.

In block 36, an animation sequence is added to a camera-motion layer. An animation, such as a Flash or an animated GIF, is inserted and maintains the motion characteristics of the camera via the camera motion parameters of the decomposed original video sequence. This is an example of an animation camera-motion layer. As an option, the camera motion parameters of the animation camera-motion layer can be the same as or different from the camera motion parameters of the original camera-motion layers. As a specific example, a motion banner can be inserted in a camera-motion layer. Motion banners are currently used, for example, on static web pages. With the invention, a motion banner can be inserted in a camera-motion layer depicting the background, and the motion banner in the composite modified video sequence appears to pan, zoom, and tilt with the camera. Further, foreground objects, such as people depicted using fixed-frame layers, can obscure the motion banner as they pass in front of the motion banner.

In block 37, a three-dimensional (3D) object is added to a camera-motion layer. As a specific example, consider the interior of a large train station (e.g., a panorama of a large open space) as the original camera-motion layer. A 3D object, comprising a 3D model and texture, of a statue of a President can be added to the station. When the object-based video compositor 7 composes the modified video sequence, camera motion parameters can be applied to the 3D object such that when the composite modified video sequence is viewed, the camera movement appears to rotate around the statue as the camera pans across the interior of the station.

In block 38, one or more user-activated areas are added to a camera-motion layer. A user-activated area is an area of a camera-motion layer that initiates an action upon activation by a user. Examples of an action initiated by a user-activated area include: accessing a web site; hyperlinking to a designated URL (uniform resource locator); opening a window; playing an audio source; playing a video source; saving data; sending data to a web site; saving a cookie; and sending an e-mail. Examples of an activation by a user for a user-activated area include: passing a cursor over the user-activated area using a user input device, such as a mouse, a pointer, or a keyboard; clicking a mouse as a cursor passes over the user-activated area; detecting eye motion of a user as the user apparently views the user-activated area; and detecting a selection or possible selection of the user-activated area by the user. The user-activated area can be a portion of a camera-motion layer or the entire camera-motion layer. A camera-motion layer can have one or more user-activated areas, and each such user-activated area can have the same or different actions and/or can be activated by the same or different activations by a user. As a specific example, consider a video scene of a hotel lobby with the name of the hotel on a wall behind the registration desk. A first user-activated area can be added over the area around the name of the hotel and includes a hyperlink to the web site for the hotel. Further, a machine for dispensing canned soda can be inserted into the video scene of the hotel lobby, as in block 31. A second user-activated area can be added over the machine for dispensing canned soda and includes a hyperlink to the web site for the producer of the canned soda.

In block 39, one or more on/off times are modified for a camera-motion layer. An on/off time indicates when in the decomposed video sequence a camera-motion layer is included in the composite video sequence. Examples of modifying on/off times include the following: an object that disappears; an object that appears; an object that disappears then reappears; an objects that appears then disappears; and an object that is visible throughout the entire composite video sequence (i.e., the object is not turned off). As a specific example, the furniture in a video scene of a hotel lobby can appear suddenly to populate the hotel lobby.

In block 40, the opaqueness of a camera-motion layer is modified. The inverse of opaqueness is transparency. Opaqueness (or transparency) can vary from opaque to transparent. As an example, a corporate logo can be placed in a video sequence as a camera-motion layer and have a slight opaqueness associated with it so that the corporate logo does not entirely occlude the underlying scene.

In block 41, one or more fade-in/fade-out parameters are modified for a camera-motion layer. The fade-in/fade-out parameters are a combination of the on/off times from block 37 and the opaqueness from block 39. Examples of modifying fade-in/fade-out parameters include the following: an object that slowly disappears; an object that rapidly appears; an object that rapidly disappears then slowly reappears; an objects that slowly appears then slowly disappears; and an object that is scene throughout the entire composite video sequence. As an example, an advertisement on a billboard in a video scene can appear to fade in and fade out of the composite modified video scene.

In block 42, the order parameter of a camera-motion layer is modified. The order parameter defines the placement of the associated camera-motion layer with respect to the other camera-motion layers and the fixed-framed layers in the decomposed video sequence. With this feature, the occlusion priority of the camera-motion layers can be adjusted. As an example, a corporate logo can be placed in a video sequence as a camera-motion layer. If the order parameter for the corporate logo is set to be always above all other layers, the corporate logo will never appear in the composite video sequence to be occluded by other objects. If the order parameter for the corporate logo is set to be above all camera-motion layers but below all fixed-frame layers, the corporate logo will appear in the composite video sequence only to be occluded by moving objects, such as people or cars.

In block 43, a camera-motion layer is deleted. As an example, if a corporate logo is represented as a camera-motion layer, and if the corporate logo is no longer desired for the video sequence, the camera-motion layer can be deleted, and the composite modified video sequence will not include the corporate logo.

In block 44, another camera-motion layer is added. The additional camera-motion layer can use the same camera motion parameters as the original camera-motion layers or can use different camera motion parameters. With this feature, an overlay can be inserted in the composite modified video sequence that tracks the apparent motion of the world. Adding camera-motion layers provides the ability to insert in the video sequence objects that move with the motion of the camera. This is accomplished by associating the camera motion parameters of the video sequence with the added camera-motion layers.

As an example, an advertising banner can be inserted as an additional camera-motion layer. Via the camera motion parameters, the advertising banner appears in the composite modified video sequence to recede in the distance as the camera zooms out or to grow larger as the camera zooms in. As another example, the effect of viewing a scene from a jail cell can be accomplished by adding an additional camera-motion layer of vertical bars in the window of the jail cell and setting the order parameter of the additional camera-motion layer to be above all other layers. As the camera pans in the composite modified video sequence, the bars will appear likewise to pan and occlude the remaining camera-motion layers and the fixed-framed layers.

In block 45, the size of a camera-motion layer is modified. By modifying the size of a camera-motion layer, additional camera motion parameters can be accommodated. For example, if it is desired to pan beyond the original camera-motion layer, the original camera-motion layer can be extended by extrapolating the camera-motion layer to accommodate the desired panning.

In block 46, one or more camera motion parameters of a camera-motion layer are edited to obtain modified camera motion parameters. The camera motion parameters can be edited by, for example, adjusting one or more of the camera motion parameters (e.g., pan or tilt). As another example, the camera motion parameters can be edited by replacing them entirely with analytically-derived camera motion parameters or with camera motion parameters from another video sequence.

Figure 5:
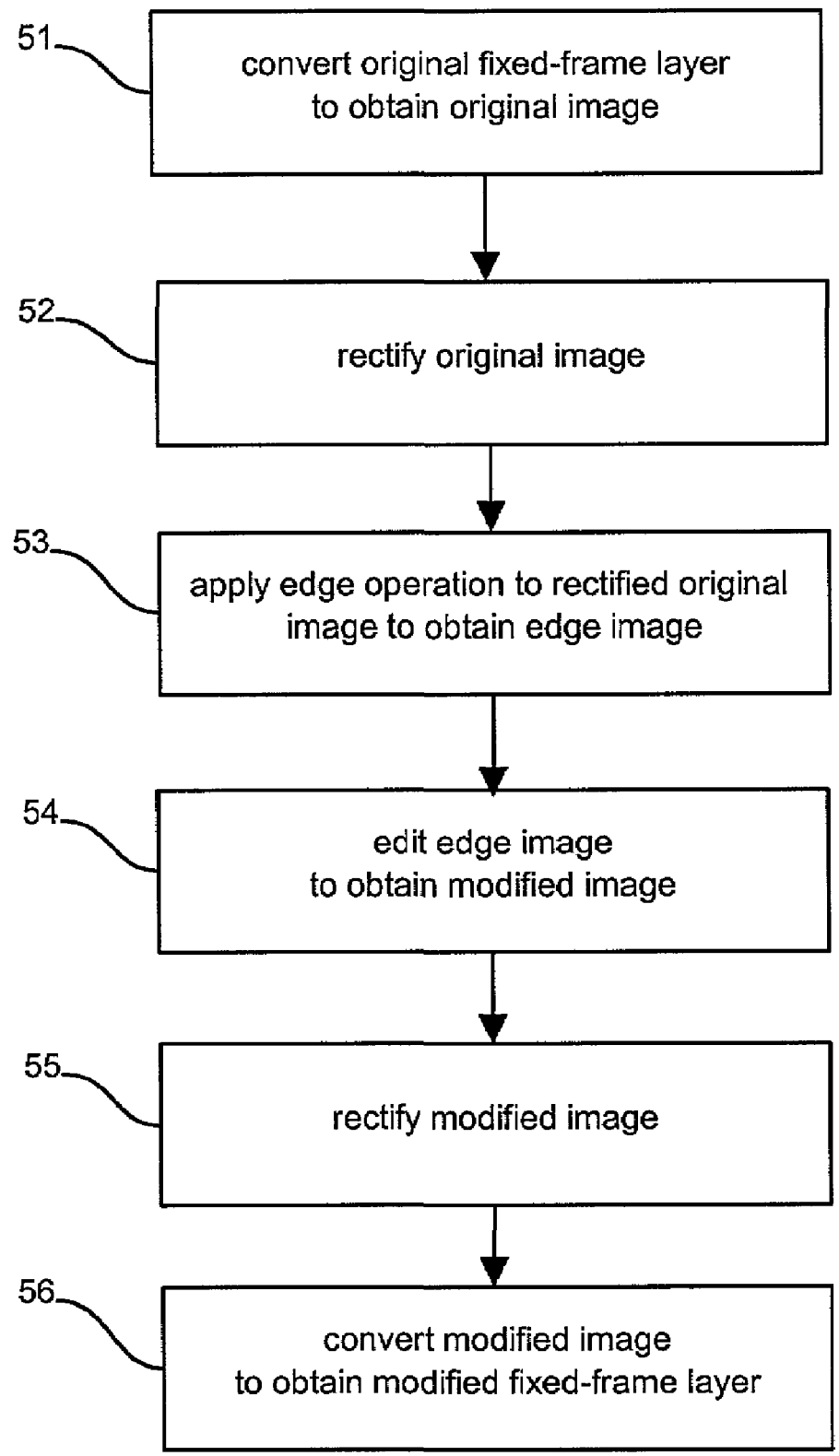
FIG. 5 illustrates a flow diagram for editing a fixed-frame layer.

FIG. 5 illustrates a flow diagram for editing an original fixed-frame layer in block 14 of FIG. 2. Blocks 51–56 in FIG. 5 are the same as blocks 21–26 in FIG. 3, except the operations are performed to an original fixed-frame layer, instead of an original camera-motion layer.

Figure 6:
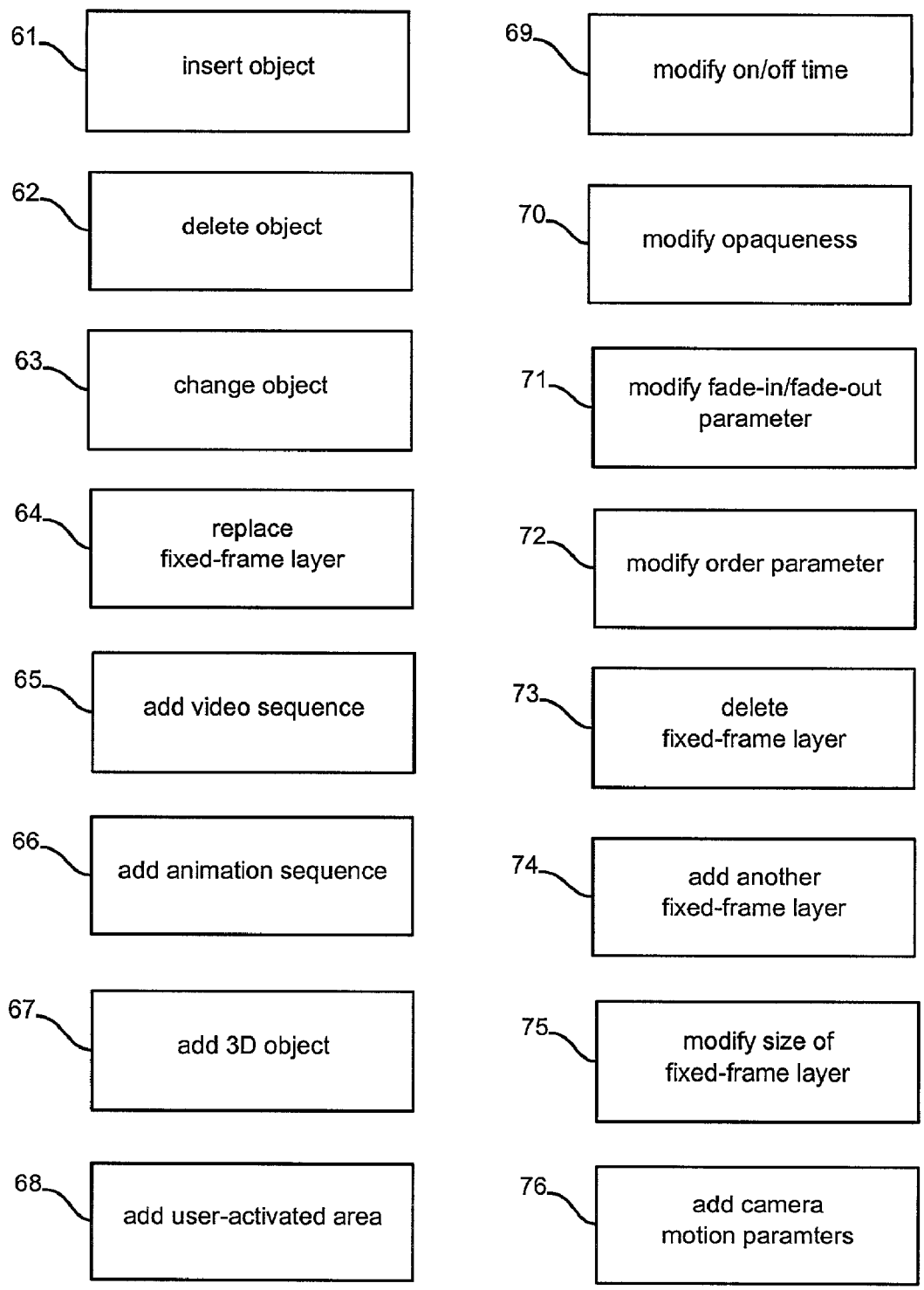
FIG. 6 illustrates various aspects of editing a fixed-frame layer.

FIG. 6 illustrates various aspects of editing an original fixed-frame layer in block 14 of FIG. 2 and in block 54 of FIG. 5. Blocks 61–75 are the same as block 31–45 in FIG. 4, except the operations are performed to fixed-frame layers instead of camera-motion layers.

Further, block 76 is different than block 46 in FIG. 4. In block 76, camera motion parameters are added to a fixed-frame layer. The camera motion parameters can be the same as or different from the camera motion parameters of the original camera-motion layers. With this edit, the fixed-frame layer becomes a camera-motion layer and can be further edited as discussed with respect to FIG. 4. As an example, an original fixed-frame layer of a person walking in a parking lot can be assigned camera motion parameters, and the original camera-motion layer for the parking lot can be replaced, as in block 34, with a scene of a beach. Further, by selecting the camera motion parameters for the edited fixed-frame layer of the person walking, another camera angle of the person walking can be obtained for the composite modified video sequence.

Figure 7:
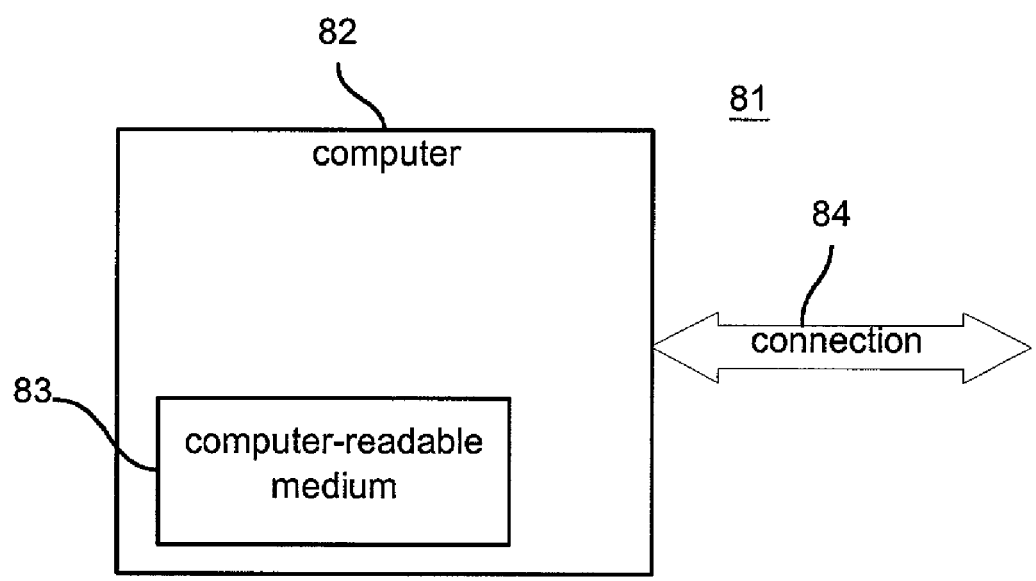
FIG. 7 illustrates a system implementation of the invention.

FIG. 7 illustrates a plan view for a system implementation of the invention. The computer system 81 includes a computer 82 for implementing the invention. The computer 82 includes a computer-readable medium 83 embodying software for implementing the invention and/or software to operate the computer 82 in accordance with the invention. A video sequence for use with the computer system 81 resides on the computer-readable medium 83 or is provided via a connection 84. The connection 84 can receive, for example, a live feed video or a computer-readable file containing a video sequence. The connection 84 can be coupled to, for example, a video camera, another computer-readable medium, or a network. As an example, the computer system 81 can implement or be part of a web site that is accessible via a network (e.g., the Internet), and an original video sequence can be modified in accordance with the invention by a user accessing the computer system 81 via the network.

The invention can be embodied as a video coloring book. A video coloring book can be contrasted with a conventional coloring book. A conventional coloring book has line-rendered drawings that can be filled in using, for example, crayons or markers. A video coloring book generates or includes one or more line-rendered portions or aspects of a video that can be filled in using, for example, image modifying software. As an option, the line-rendered portions can have other modifications performed to them as well. A video coloring book can be viewed as an extension of the conventional coloring book to video. Software to implement a video coloring book according to the invention can edit camera-motion layers and/or fixed-frame layers. The camera-motion layers for a video coloring book can be obtained from a video sequence or from an image. Examples such as image are the same examples described for block 34. Software to implement a video coloring book according to the invention can be embodied on a computer-readable medium and distributed accordingly or can be embodied on a computer system as part of a web site and accessed via a network, such as the Internet.

Figure 8:
FIG. 8 illustrates an example of a frame of an original video sequence.
Figure 9:
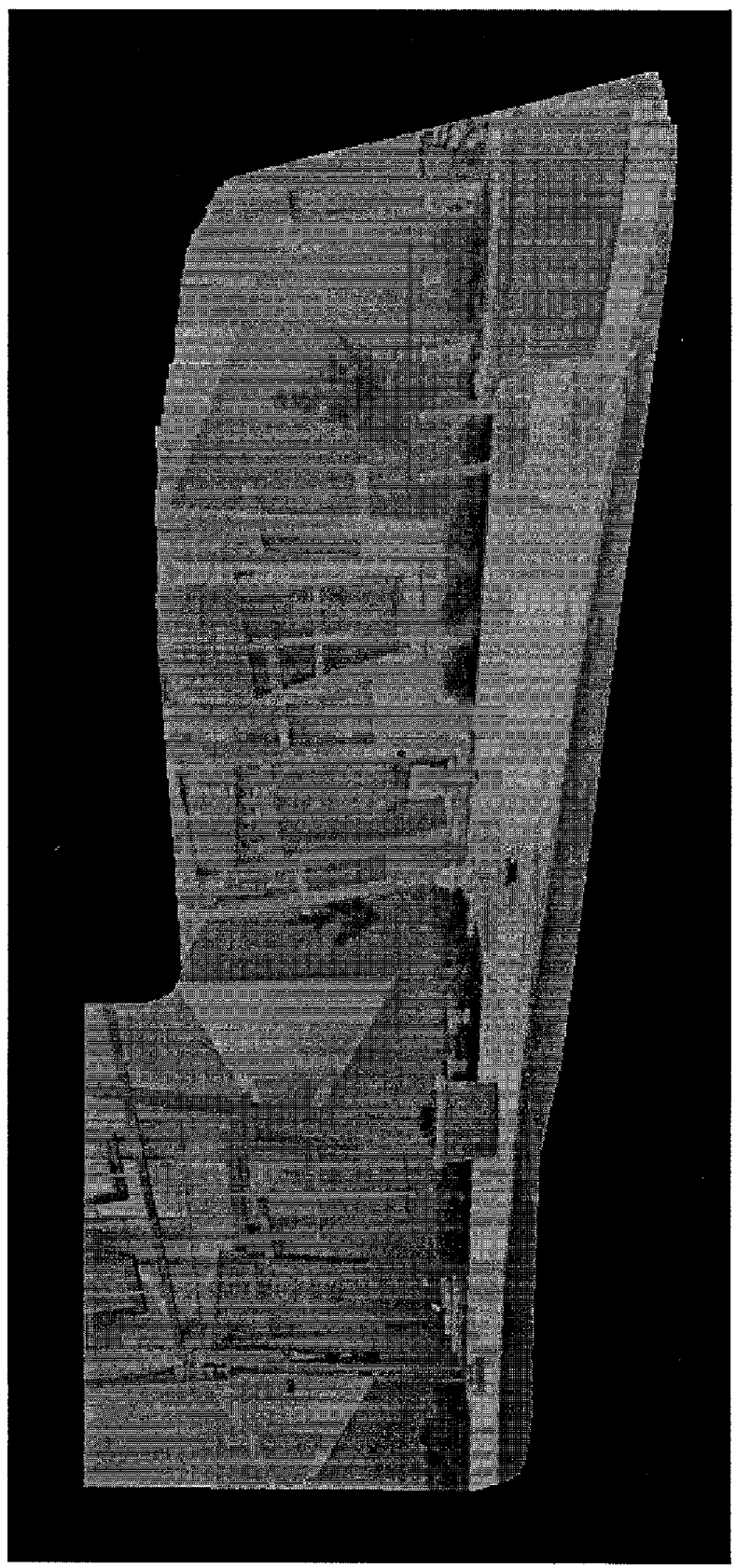
FIG. 9 illustrates an example of an original image for a camera-motion layer obtained from the frame of FIG. 8.
Figure 10:
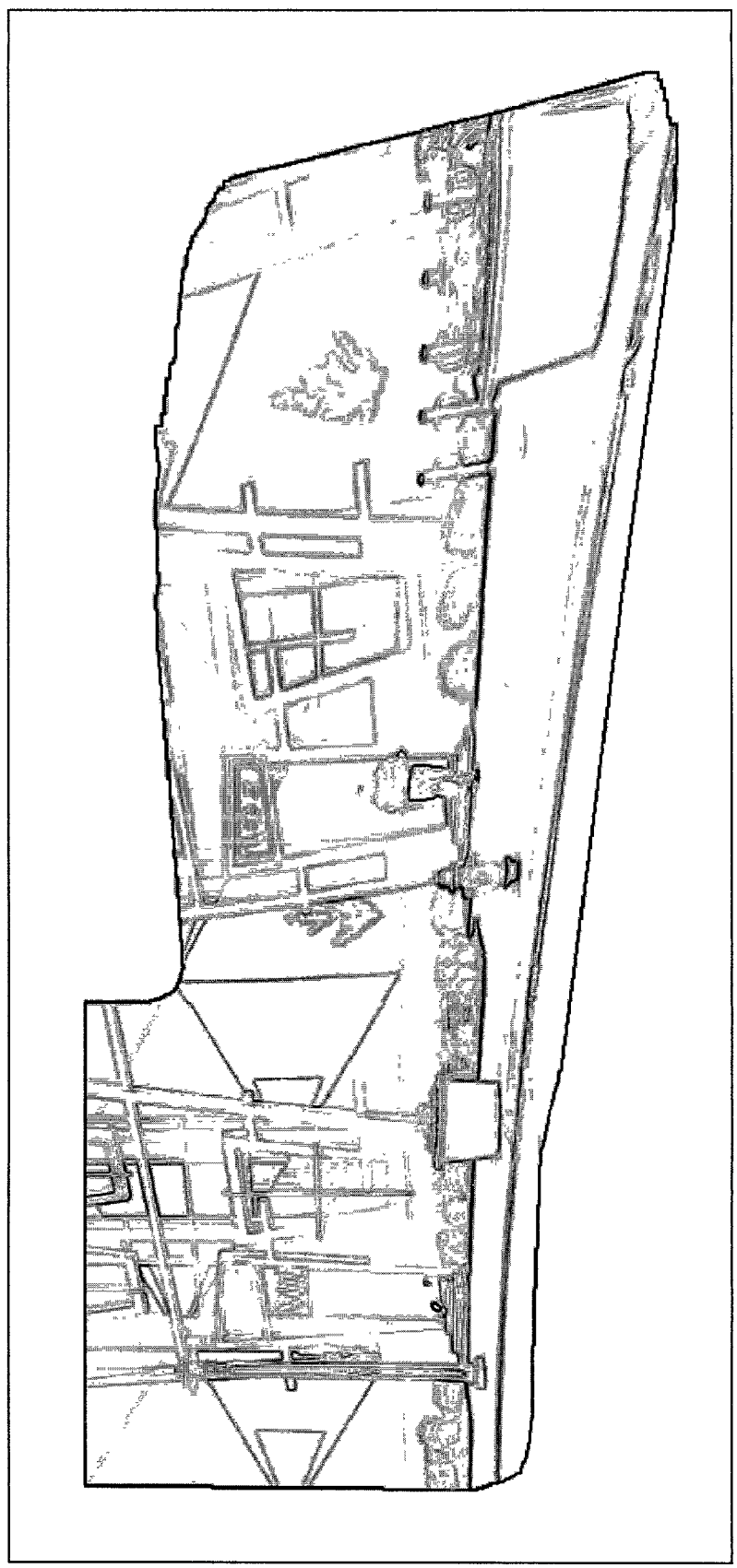
FIG. 10 illustrates an example of an edge image obtained from the original image of FIG. 9.
Figure 11:
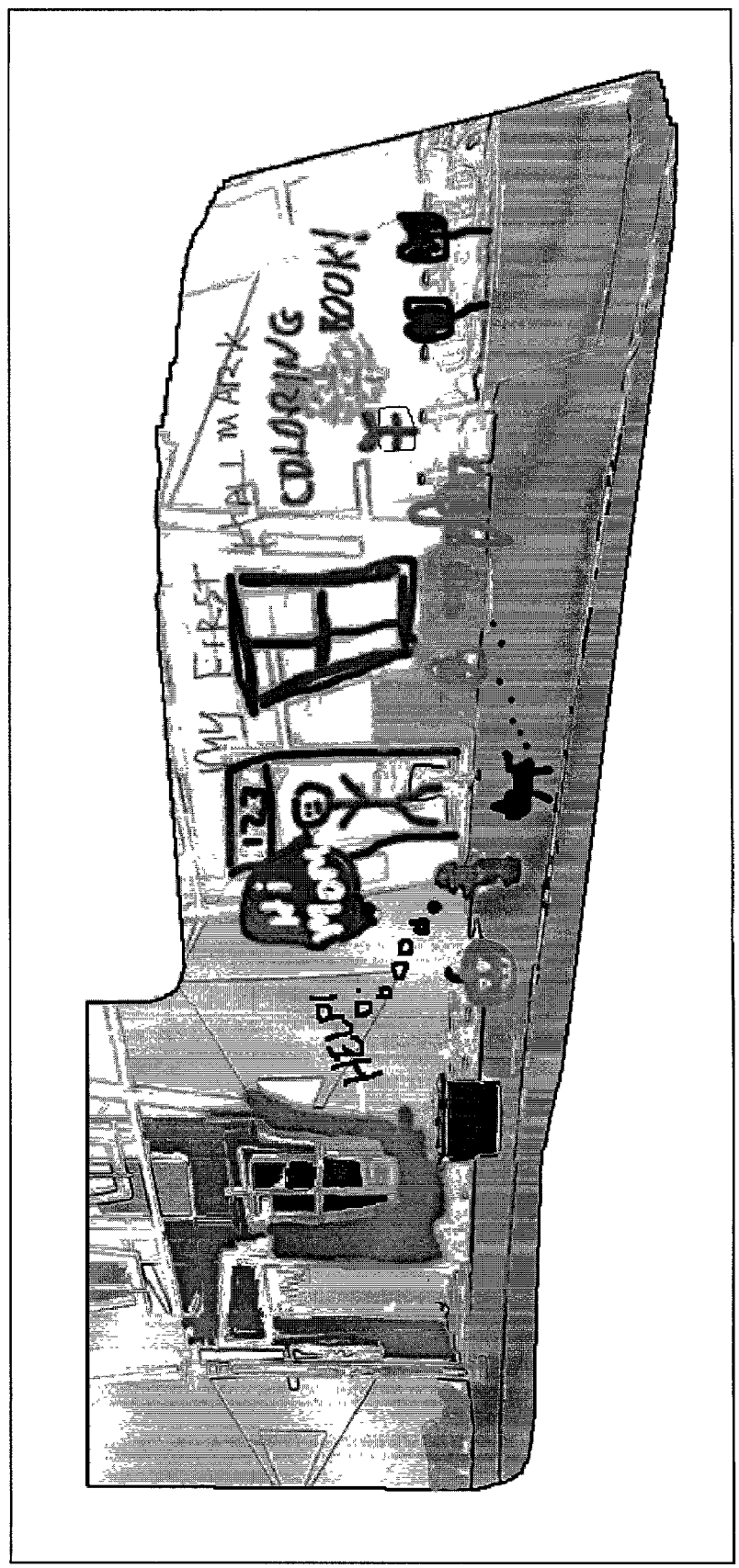
FIG. 11 illustrates an example of a modified image obtained from the edge image of FIG. 10.

An example of a video coloring book is illustrated with FIGS. 8–11. FIG. 8 illustrates an example of a frame of an original video sequence obtained in block 11 of FIG. 2. In block 12, the original video sequence is decomposed to obtain a camera-motion layer and zero or more fixed-frame layers. In blocks 21 and 22, the camera-motion layer is converted to an original image and rectified. FIG. 9 illustrates an example of the rectified image for the camera-motion layer obtained from the frame of FIG. 8. In block 23, an edge operation is performed to the rectified image in FIG. 9, and the edge image illustrated in FIG. 10 results. In block 24, the edge image of FIG. 10 is edited to obtain a modified image, and the modified image of FIG. 11 results. In this example, the edge image is edited according to block 31. For instance, a jack-o-lantern, a dog caricature, and a present are inserted; the building on the left, the pot for the plant, and the sidewalk are colored in; and a stick figure of a person with a balloon "Hi Mom" are inserted. In blocks 25 and 26, the modified image is rectified and converted to a modified camera-motion layer. In blocks 15–18, a composite modified video sequence is obtained from the modified camera-motion layer.

Extending the example, other modifications to the edge image of FIG. 10 can be performed according any of the techniques illustrated in FIG. 4. For instance, instead of inserting the balloon "Hi Mom," an audio source for "Hi Mom" can be inserted and activated by a mouse passing over the stick figure according to block 38. Instead of the stick figure, a video sequence of the person who edited the edge image can be inserted according to block 35. Instead of keeping the camera motion parameters of the original video sequence, the camera motion parameters can be modified according to block 46 such that the camera hovers over the fire hydrant and the dog caricature.

Extending the example further, the original fixed-frame layers of the original video sequence can be modified to obtain modified fixed-frame layers as per block 14.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A computer-readable medium having software for editing a decomposed original video sequence, said decomposed original video sequence comprising one or more original camera-motion layers that appear to move with a camera as the camera moves, and zero or more original fixed-frame layers decomposed from an original video sequence, said software comprising:

code segments for editing at least one of said original camera-motion layers to obtain modified camera-motion layers such that each frame of a composite modified video sequence composed from said modified camera-motion layers and said original fixed-frame layers is obtained without editing each frame of said original video sequence, said editing comprising performing an edge operation to one of said original camera-motion layers.

2. A computer-readable medium as in claim 1, wherein said code segments for editing said original camera-motion layers comprise:

code segments for converting one of said original camera-motion layers to said original image;

code segments for performing said edge operation to said original image to obtain an edge image;

code segments for editing said edge image to obtain a modified image; and code segments for converting said modified image to one of said modified camera-motion layers.

3. A computer-readable medium as in claim 2, wherein said code segments for editing said original camera-motion layers further comprise:

code segments for rectifying said original image prior to performing said edge operation; and code segments for rectifying said modified image prior to converting said modified image.

4. A computer-readable medium as in claim 1, wherein said code segments for editing said original camera-motion layers comprise:

code segments for inserting a portion into, deleting a portion from, or changing a portion of one of said original camera-motion layers to obtain one of said modified camera-motion layers.

5. A computer-readable medium as in claim 1, wherein said code segments for editing said original camera-motion layers comprise:

code segments for replacing one of said original camera-motion layers with another camera-motion layer to obtain one of said modified camera-motion layers.

6. A computer-readable medium as in claim 1, wherein said code segments for editing said original camera-motion layers comprise:

code segments for adding a video sequence to one of said original camera-motion layers to obtain one of said modified camera-motion layers.

7. A computer-readable medium as in claim 1, wherein said code segments for editing said original camera-motion layers comprise:

code segments for adding an animation sequence to one of said original camera-motion layers to obtain one of said modified camera-motion layers.

8. A computer-readable medium as in claim 1, wherein said code segments for editing said original camera-motion layers comprise:

code segments for adding a three-dimensional object to one of said original camera-motion layers to obtain one of said modified camera-motion layers.

9. A computer-readable medium as in claim 1, wherein said code segments for editing said original camera-motion layers comprise:

code segments for adding a user-activated region to one of said original camera-motion layers to obtain one of said modified camera-motion layers.

10. A computer-readable medium as in claim 1, wherein said code segments for editing said original camera-motion layers comprise:

code segments for modifying an on/off time of one of said original camera-motion layers to obtain one of said modified camera-motion layers.

11. A computer-readable medium as in claim 1, wherein said code segments for editing said original camera-motion layers comprise:
code segments for modifying an opaqueness of one of said original camera-motion layers to obtain one of said modified camera-motion layers.

12. A computer-readable medium as in claim 1, wherein said code segments for editing said original camera-motion layers comprise:
code segments for modifying fade-in/fade-out of one of said original camera-motion layer to obtain one of said modified camera-motion layers.

13. A computer-readable medium as in claim 1, wherein said code segments for editing said original camera-motion layers comprise:
code segments for modifying an ordering of one of said original camera-motion layers with respect to other layers of said decomposed original video sequence to obtain said modified camera-motion layers.

14. A computer-readable medium as in claim 1, wherein said code segments for editing said original camera-motion layers comprise:
code segments for deleing one of said original camera-motion layers of said decomposed original video sequence.

15. A computer-readable medium as in claim 1, wherein said code segments for editing said original camera-motion layers comprise:
code segments for adding another camera-motion layer to said decomposed original video sequence, such that an ordering of said original camera-motion layers with respect to other layers of said decomposed original video sequence is modified to obtain said modified camera-motion layers.

16. A computer-readable medium as in claim 1, wherein said code segments for editing said original camera-motion layers comprise:
code segments for modifying a size of one of said original camera-motion layer to obtain one of said modified camera-motion layer.

17. A computer-readable medium as in claim 1, wherein said code segments for editing said original camera-motion layers comprise:
code segments for editing camera motion parameters of one of said original camera-motion layer to obtain modified camera motion parameters.

18. A computer-readable medium as in claim 17, wherein said code segments for editing camera motion parameters comprise:
code segments for adjusting at least one of said camera motion parameters to obtain said modified camera motion parameters.

19. A computer-readable medium as in claim 17, wherein said code segments for editing camera motion parameters comprise:
code segments for replacing said camera motion parameters with analytically-derived camera motion parameters to obtain said modified camera motion parameters.

20. A computer-readable medium as in claim 17, wherein said code segments for editing camera motion parameters comprise:
code segments for replacing said camera motion parameters with camera motion parameters from another video sequence to obtain said modified camera motion parameters.

21. A computer-readable medium as in claim 1, further comprising the step of:
code segments for editing at least one of said original fixed-frame layers to obtain modified fixed-frame layers, said editing comprising performing an edge operation to one of said original fixed-frame layers.

22. A computer-readable medium as in claim 21, wherein said code segments for editing said original fixed-frame layers comprise:
code segments for converting one of said original fixed-frame layers to an original image;
code segments for performing said edge operation to said original image to obtain an edge image;
code segments for editing said edge image to obtain a modified image; and
code segments for converting said modified image to one of said modified fixed-frame layers.

23. A computer-readable medium as in claim 22, wherein said code segments for editing said original fixed-frame layers further comprise:
code segments for rectifying said original image prior to performing said edge operation; and
code segments for rectifying said modified image prior to converting said modified image.

24. A computer-readable medium as in claim 21, wherein said code segments for editing said original fixed-frame layers comprise:
code segments for adding camera motion parameters to at least one of said original fixed-frame layers.

25. A computer comprising the computer-readable medium of claim 1.

26. A method for editing a decomposed original video sequence, said decomposed original video sequence comprising one or more original camera-motion layers that appear to move with a camera as the camera moves, and zero or more original fixed-frame layers decomposed from an original video sequence, comprising the step of:
editing at least one of said original camera-motion layers to obtain modified camera-motion layers such that each frame of a composite modified video sequence composed from said modified camera-motion layers and said original fixed-frame layers is obtained without editing each frame of said original video sequence, said editing comprising performing an edge operation to one of said original camera-motion layers.

27. An apparatus for editing a decomposed original video sequence, said decomposed original video sequence comprising one or more original camera-motion layers that appear to move with a camera as the camera moves and zero or more original fixed-frame layers decomposed from an original video sequence, comprising:
means for editing at least one of said original camera-motion layers to obtain modified camera-motion layers such that each frame of a composite modified video sequence composed from said modified camera-motion layers and said original fixed-frame layers is obtained without editing each frame of said original video sequence, said editing comprising performing an edge operation to one of said original camera-motion layers.

28. An apparatus as in claim 27, further comprising:
means for editing at least one of said original fixed-frame layers to obtain modified fixed-frame layers.

29. An apparatus for editing an original video sequence, comprising:
an object-based video encoder to decompose said original video sequence into a decomposed original video sequence, said decomposed original video sequence comprising one or more original camera-motion layers that appear to move with a camera as the camera moves, and zero or more original fixed-frame layers;

a video editor to perform an edge operation to one of said original camera-motion layers and to edit said edge operated original camera-motion layers to obtain a decomposed modified video sequence; and an object-based video compositor to compose said decomposed modified video sequence to obtain a composite modified video sequence, wherein each frame of said composite modified video sequence is obtained without editing each frame of said original video sequence.

30. A computer-readable medium having software for implementing a video coloring book, wherein said software comprises code segments for editing at least one camera-motion layer that appears to move with a camera as the camera moves.

31. A computer-readable medium as in claim 30, wherein the camera-motion layer is decomposed from a video sequence.

32. A computer-readable medium as in claim 30, wherein the camera-motion layer is an image.

33. A computer-readable medium as in claim 30, said software comprising code segments for editing at least one fixed-frame layer.

* * * * *